US012629887B2

(12) United States Patent
Bromberg et al.

(10) Patent No.: US 12,629,887 B2
(45) Date of Patent: May 19, 2026

(54) RECOAT ASSEMBLIES INCLUDING A SHAFT WITH A ROTATING FLANGE CONTAINING POWDER BETWEEN ROLLERS FOR ADDITIVE MANUFACTURING SYSTEMS

(71) Applicant: General Electric Company, Schenectady, NY (US)

(72) Inventors: Vadim Bromberg, Niskayuna, NY (US); John Sterle, Clifton Park, NY (US); Joshua Tyler Mook, Cincinnati, OH (US); Samantha Jo Rowe, West Chester, OH (US)

(73) Assignee: General Electric Company, Evendale, OH (US)

( * ) Notice: Subject to any disclaimer, the term of this patent is extended or adjusted under 35 U.S.C. 154(b) by 307 days.

(21) Appl. No.: 18/367,652

(22) Filed: Sep. 13, 2023

(65) Prior Publication Data

US 2024/0157640 A1     May 16, 2024

Related U.S. Application Data

(60) Provisional application No. 63/424,604, filed on Nov. 11, 2022.

(51) Int. Cl.
B29C 64/218 (2017.01)
B29C 64/153 (2017.01)
(Continued)

(52) U.S. Cl.
CPC .......... B29C 64/218 (2017.08); B29C 64/153 (2017.08); B29C 64/307 (2017.08); B33Y 10/00 (2014.12); B33Y 30/00 (2014.12)

(58) Field of Classification Search
CPC .... B29C 64/218; B29C 64/307; B29C 64/321
See application file for complete search history.

(56) References Cited

U.S. PATENT DOCUMENTS

| | | | |
|---|---|---|---|
| 4,401,740 A | 8/1983 | Kawabata et al. | |
| 4,735,144 A | 4/1988 | Jenkins | |
| | (Continued) | | |

FOREIGN PATENT DOCUMENTS

| | | | |
|---|---|---|---|
| CN | 108773070 A | 11/2018 | |
| DE | 102017003662 A1 | 10/2018 | |
| | (Continued) | | |

OTHER PUBLICATIONS

Extended European Search Report for Application No. 23204562.5 dated Apr. 5, 2024 (15 pages).

*Primary Examiner* — Xiao S Zhao
*Assistant Examiner* — Nicholas J Chidiac
(74) *Attorney, Agent, or Firm* — Dinsmore & Shohl LLP

(57) ABSTRACT

A recoat assembly for an additive manufacturing system includes a base member movable in a first lateral direction and a second lateral direction opposite the first lateral direction, a powder spreading member coupled to the base member, and a containment mechanism. The base member includes a primary containment housing at least partially encapsulating the powder spreading member. The containment mechanism is positionable into a first position when the base member is moving in the first lateral direction, and positionable into a second position different from the first position when the base member is moving in the second lateral direction.

20 Claims, 7 Drawing Sheets

(51) Int. Cl.
  *B29C 64/307*      (2017.01)
  *B33Y 10/00*      (2015.01)
  *B33Y 30/00*      (2015.01)

(56)        References Cited

U.S. PATENT DOCUMENTS

| | | |
|---|---|---|
| 9,855,704 B2 | 1/2018 | Miyano et al. |
| 10,870,237 B2 | 12/2020 | Kao et al. |
| 2017/0326792 A1 | 11/2017 | Paternoster et al. |
| 2018/0304302 A1 | 10/2018 | Sachs et al. |
| 2019/0060998 A1 | 2/2019 | Kelkar et al. |
| 2020/0130274 A1 | 4/2020 | Van Den Ecker |
| 2022/0227042 A1 | 7/2022 | Bromberg et al. |
| 2022/0227046 A1 | 7/2022 | Bromberg et al. |
| 2022/0227047 A1 | 7/2022 | Bromberg et al. |
| 2022/0314545 A1 | 10/2022 | Chan et al. |

FOREIGN PATENT DOCUMENTS

| | | | | |
|---|---|---|---|---|
| JP | 2015066872 A | 4/2015 | | |
| JP | 6620505 B2 * | 12/2019 | | |
| WO | 9623647 A2 | 8/1996 | | |
| WO | 2020237142 A1 | 11/2020 | | |
| WO | 2020237143 A1 | 11/2020 | | |
| WO | WO-2020237144 A1 * | 11/2020 | ............. | B33Y 50/02 |

* cited by examiner

RECOAT ASSEMBLIES INCLUDING A SHAFT WITH A ROTATING FLANGE CONTAINING POWDER BETWEEN ROLLERS FOR ADDITIVE MANUFACTURING SYSTEMS

CROSS REFERENCE TO RELATED APPLICATION

This application claims the benefit of U.S. Provisional Patent Application No. 63/424,604, filed Nov. 11, 2022, for "Recoat Assemblies Including Powder Containment Mechanisms And Additive Manufacturing Systems Including Same," which is hereby incorporated by reference in its entirety including the drawings.

TECHNICAL FIELD

The present specification generally relates to additive manufacturing systems and, more specifically, recoat assemblies of additive manufacturing systems for maintaining uniform build layers.

BACKGROUND

Additive manufacturing systems may be utilized to "build" an object from build material, such as organic or inorganic powders, in a layer-wise manner. Conventional additive manufacturing systems include various "recoat" apparatuses that are configured to sequentially distribute layers of build material, such that a binder material can be deposited and cured to "build" an object. However, conventional recoat apparatuses may inconsistently distribute build material, leading to variation in the objects built by the additive manufacturing system. Moreover, some conventional recoat apparatuses distribute build material by fluidizing or mobilizing the build material, and airborne build material may be dispersed to other components of the additive manufacturing system and may interfere with and/or degrade the other components of the additive manufacturing system.

Accordingly, a need exists for alternative recoat assemblies for additive manufacturing systems.

BRIEF DESCRIPTION OF THE DRAWINGS

The embodiments set forth in the drawings are illustrative and exemplary in nature and not intended to limit the subject matter defined by the claims. The following detailed description of the illustrative embodiments can be understood when read in conjunction with the following drawings, where like structure is indicated with like reference numerals and in which:

DETAILED DESCRIPTION

Figure 1:
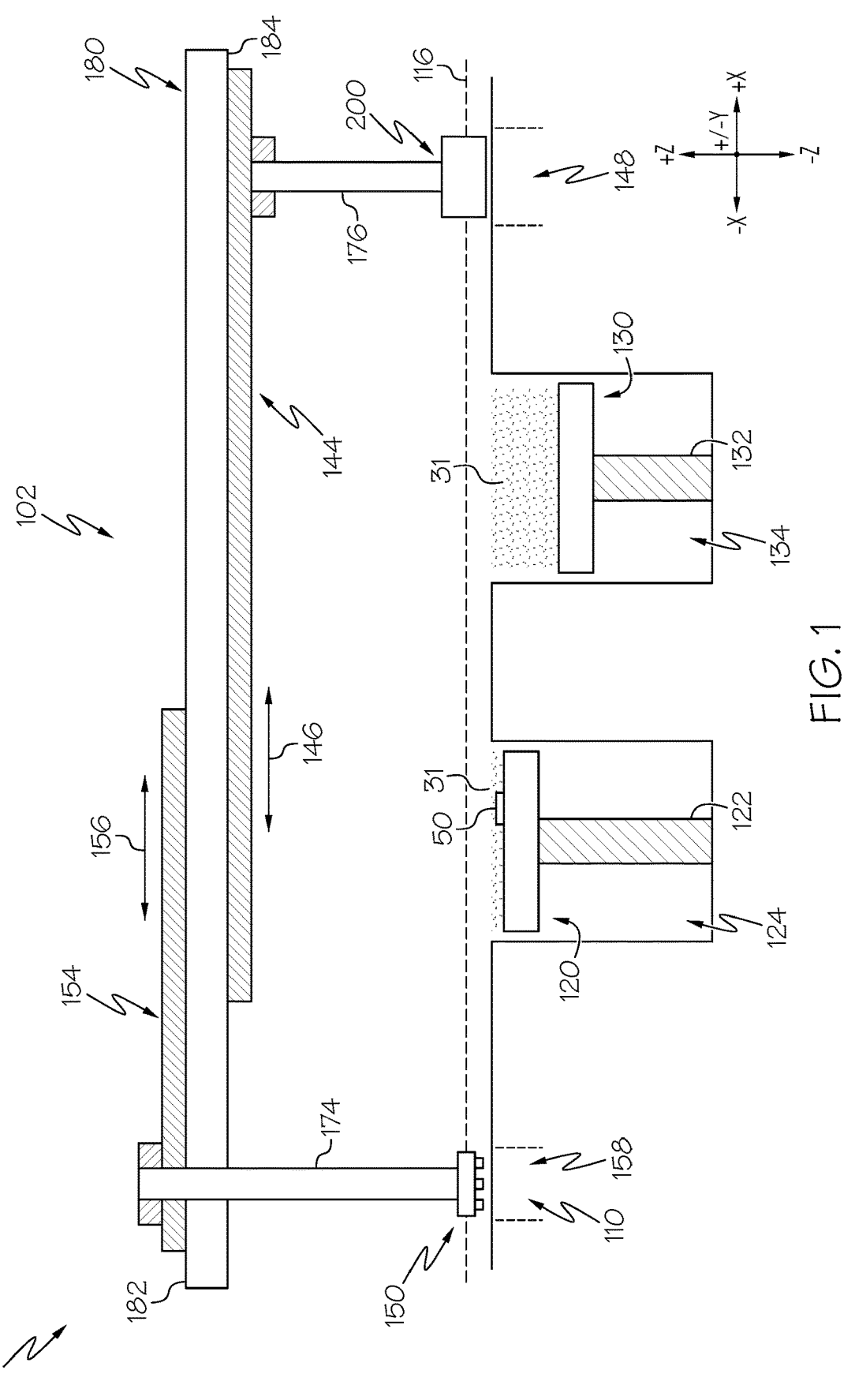
FIG. 1 schematically depicts an additive manufacturing system, according to one or more embodiments shown and described herein.

Embodiments described herein are directed to recoat assemblies for an additive manufacturing system including a base member movable in a first lateral direction and a second lateral direction opposite the first lateral direction, a powder spreading member coupled to the base member, and a containment mechanism. The base member includes a primary containment housing at least partially encapsulating the powder spreading member. The containment mechanism is positionable into a first position when the base member is moving in the first lateral direction, and positionable into a second position different from the first position when the base member is moving in the second lateral direction. The containment mechanism prevents aerosolized build material from entering the primary containment housing at a first end thereof and being redeposited on a build area at an opposite end of the primary containment housing by traveling over the powder spreading member.

Various embodiments of the recoat assemblies and additive manufacturing systems, and the operation of the recoat assemblies and additive manufacturing systems are described in more detail herein. Whenever possible, the same reference numerals will be used throughout the drawings to refer to the same or like parts.

Ranges can be expressed herein as from "about" one particular value, and/or to "about" another particular value. When such a range is expressed, another embodiment includes from the one particular value and/or to the other particular value. Similarly, when values are expressed as approximations, by use of the antecedent "about," it will be understood that the particular value forms another embodiment. It will be further understood that the endpoints of each of the ranges are significant both in relation to the other endpoint, and independently of the other endpoint.

Directional terms as used herein—for example up, down, right, left, front, back, top, bottom—are made only with reference to the figures as drawn and are not intended to imply ab solute orientation.

Unless otherwise expressly stated, it is in no way intended that any method set forth herein be construed as requiring that its steps be performed in a specific order, nor that with any apparatus specific orientations be required. Accordingly, where a method claim does not actually recite an order to be followed by its steps, or that any apparatus claim does not actually recite an order or orientation to individual components, or it is not otherwise specifically stated in the claims or description that the steps are to be limited to a specific order, or that a specific order or orientation to components of an apparatus is not recited, it is in no way intended that an order or orientation be inferred, in any respect. This holds for any possible non-express basis for interpretation, including: matters of logic with respect to arrangement of steps, operational flow, order of components, or orientation of components; plain meaning derived from grammatical organization or punctuation, and; the number or type of embodiments described in the specification.

As used herein, the singular forms "a," "an" and "the" include plural referents unless the context clearly dictates otherwise. Thus, for example, reference to "a" component includes aspects having two or more such components, unless the context clearly indicates otherwise.

Embodiments described herein are generally directed to recoat assemblies for additive manufacturing systems. Additive manufacturing systems may generally "build" materials through successive deposition and binding of build material. In conventional additive manufacturing systems, deposition of build material is a difficult, dirty, time-consuming, and error-prone process. Embodiments described herein are directed to recoat assemblies that deposit build material in a consistent and configurable manner.

Referring now to FIG. 1, an embodiment of an additive manufacturing system 100 is schematically depicted. The additive manufacturing system 100 includes a cleaning station 110, a build platform 120 positioned within a build area 124, a supply platform 130 positioned within a supply receptacle 134, and an actuator assembly 102. The actuator assembly 102 comprises, among other elements, a recoat assembly 200 for distributing build material 31 and a print head 150 for depositing binder material 50. The actuator assembly 102 is constructed to facilitate traversing the recoat assembly 200 and the print head 150 over a working axis 116 of the additive manufacturing system 100 independent of one another. This allows for at least some steps of the additive manufacturing process to be performed simultaneously thereby reducing the overall cycle time of the additive manufacturing process to less than the sum of the cycle time for each individual step. In the embodiments of the additive manufacturing system 100 described herein, the working axis 116 of the additive manufacturing system 100 is parallel to the +/−X axis of the coordinate axes depicted in the figures. It should be understood that the components of the additive manufacturing system 100 traversing the working axis 116, such as the print head 150, the recoat assembly 200, and the like, need not be centered on the working axis 116. However, in the embodiments described herein, at least two of the components of the additive manufacturing system 100 are arranged with respect to the working axis 116 such that, as the components traverse the working axis, the components could occupy the same or an overlapping volume along the working axis if not properly controlled.

In the embodiments described herein, the cleaning station 110, the build platform 120, and the supply platform 130 are positioned in series along the working axis 116 of the additive manufacturing system 100 between a print home position 158 of the print head 150 located proximate to an end of the working axis 116 in the −X direction, and a recoat home position 148 of the recoat assembly 200 located proximate to an end of the working axis 116 in the +X direction. That is, the print home position 158 and the recoat home position 148 are spaced apart from one another in a horizontal direction that is parallel to the +/−X axis of the coordinate axes depicted in the figures and the cleaning station 110, the build area 124, and the supply platform 130 are positioned therebetween. In the embodiments described herein, the build area 124 is positioned between the cleaning station 110 and the supply platform 130 along the working axis 116 of the additive manufacturing system 100.

The cleaning station 110 is positioned proximate to one end of the working axis 116 of the additive manufacturing system 100 and is located with the print home position 158 where the print head 150 is located or "parked" before and after depositing binder material 50 on a layer of build material 31 positioned on the build area 124. The cleaning station 110 may include one or more cleaning sections (not shown) to facilitate cleaning the print head 150 between depositing operations. The cleaning sections may include, for example and without limitation, a soaking station containing a cleaning solution for dissolving excess binder material from the print head 150, a wiping station for removing excess binder material from the print head 150, a jetting station for purging binder material and cleaning solution from the print head 150, a park station for maintaining moisture in the nozzles of the print head 150, or various combinations thereof. The print head 150 may be transitioned between the cleaning sections by the actuator assembly 102.

While reference is made herein to additive manufacturing systems including a print head 150 that dispenses a binder material 50, it should be understood that recoat assemblies 200 described herein may be utilized with other suitable additive powder-based additive manufacturing systems. For example, in some embodiments, instead of building objects with a cured binder material 50 applied to build material 31, in some embodiments, a laser or other energy source may be applied to the build material 31 to fuse the build material 31.

In the embodiment depicted in FIG. 1, the build area 124 comprises a receptacle including a build platform 120. The build platform 120 is coupled to a build platform actuator 122 to facilitate raising and lowering the build platform 120 relative to the working axis 116 of the additive manufacturing system 100 in a vertical direction (i.e., a direction parallel to the +/−Z axis of the coordinate axes depicted in the figures). The build platform actuator 122 may be, for example and without limitation, a mechanical actuator, an electro-mechanical actuator, a pneumatic actuator, a hydraulic actuator, or any other actuator suitable for imparting linear motion to the build platform 120 in a vertical direction. Suitable actuators may include, without limitation, a worm drive actuator, a ball screw actuator, a pneumatic piston, a hydraulic piston, an electro-mechanical linear actuator, or the like. The build platform 120 and build platform actuator 122 are positioned in a build area 124 located below the working axis 116 (i.e., in the −Z direction of the coordinate axes depicted in the figures) of the additive manufacturing system 100. During operation of the additive manufacturing system 100, the build platform 120 is retracted into the build area 124 by action of the build platform actuator 122 after each layer of binder material 50 is deposited on the build material 31 located on build platform 120. While the build area 124 described and depicted herein includes a receptacle, it should be understood that the build area 124 may include any suitable structure for supporting build material 31 and may for example include a mere surface supporting the build material 31.

The supply platform 130 is coupled to a supply platform actuator 132 to facilitate raising and lowering the supply platform 130 relative to the working axis 116 of the additive manufacturing system 100 in a vertical direction (i.e., a direction parallel to the +/−Z axis of the coordinate axes depicted in the figures). The supply platform actuator 132 may be, for example and without limitation, a mechanical actuator, an electro-mechanical actuator, a pneumatic actuator, a hydraulic actuator, or any other actuator suitable for imparting linear motion to the supply platform 130 in the vertical direction. Suitable actuators may include, without limitation, a worm drive actuator, a ball screw actuator, a pneumatic piston, a hydraulic piston, an electro-mechanical linear actuator, or the like. The supply platform 130 and supply platform actuator 132 are positioned in the supply receptacle 134 located below the working axis 116 (i.e., in the −Z direction of the coordinate axes depicted in the figures) of the additive manufacturing system 100. During operation of the additive manufacturing system 100, the supply platform 130 is raised relative to the supply receptacle 134 and towards the working axis 116 of the additive manufacturing system 100 by action of the supply platform actuator 132 after a layer of build material 31 is distributed from the supply platform 130 to the build platform 120.

In embodiments, the actuator assembly 102 generally includes a recoat assembly transverse actuator 144, a print head actuator 154, a first guide 182, and a second guide 184. The recoat assembly transverse actuator 144 is operably coupled to the recoat assembly 200 and is operable to move the recoat assembly 200 relative to the build platform 120 to dispense build material 31 on the build platform 120. The print head actuator 154 is operably coupled to the print head 150 and is operable to move the print head 150 and is operable to move the print head 150 relative to the build platform 120 to dispense the binder material 50 on the build platform 120.

In the embodiments described herein, the first guide 182 and the second guide 184 extend in a horizontal direction (i.e., a direction parallel to the +/−X axis of the coordinate axes depicted in the figures) parallel to the working axis 116 of the additive manufacturing system 100 and are spaced apart from one another in the vertical direction. When the actuator assembly 102 is positioned over the cleaning station 110, the build platform 120, and the supply platform 130 as depicted in FIG. 1, the first guide 182 and the second guide 184 extend in a horizontal direction from at least the cleaning station 110 to beyond the supply platform 130.

In the embodiment of the actuator assembly 102 depicted in FIG. 1, the first guide 182 and the second guide 184 are opposite sides of a rail 180 that extends in a horizontal direction and is oriented such that the first guide 182 is positioned above and spaced apart from the second guide 184. For example, in one embodiment, the rail 180 has an "I" configuration in vertical cross section (i.e., a cross section in the Y-Z plane of the coordinate axes depicted in the figures) with upper and lower flanges of the "I" forming the first guide 182 and the second guide 184, respectively. However, it should be understood that other embodiments are contemplated and possible. For example and without limitation, the first guide 182 and the second guide 184 may be separate structures, such as separate rails, extending in the horizontal direction and spaced apart from one another in the vertical direction. In some embodiments, the first guide 182 and the second guide 184 may be positioned at the same height and spaced apart from one another on opposite sides of the rail 180. In embodiments, the first guide 182 and the second guide 184 are positioned in any suitable configuration, and may be collinear.

In the embodiments described herein, the recoat assembly transverse actuator 144 is coupled to one of the first guide 182 and the second guide 184, and the print head actuator 154 is coupled to the other of the first guide 182 and the second guide 184 such that the recoat assembly transverse actuator 144 and the print head actuator 154 are arranged in a "stacked" configuration. For example, in the embodiment of the actuator assembly 102 depicted in FIG. 1, the recoat assembly transverse actuator 144 is coupled to the second guide 184 and the print head actuator 154 is coupled to the first guide 182. However, it should be understood that, in other embodiments, the recoat assembly transverse actuator 144 may be coupled to the first guide 182 and the print head actuator 154 may be coupled to the second guide 184.

In the embodiments described herein, the recoat assembly transverse actuator 144 is bi-directionally actuatable along a recoat motion axis 146 and the print head actuator 154 is bi-directionally actuatable along a print motion axis 156. That is, the recoat motion axis 146 and the print motion axis 156 define the axes along which the recoat assembly transverse actuator 144 and the print head actuator 154 are actuatable, respectively. The recoat motion axis 146 and the print motion axis 156 extend in a horizontal direction and are parallel with the working axis 116 of the additive manufacturing system 100. In the embodiments described herein, the recoat motion axis 146 and the print motion axis 156 are parallel with one another and spaced apart from one another in the vertical direction due to the stacked configuration of the recoat assembly transverse actuator 144 and the print head actuator 154. In some embodiments, such as the embodiment of the actuator assembly 102 depicted in FIG. 1, the recoat motion axis 146 and the print motion axis 156 are located in the same vertical plane (i.e., a plane parallel to the X-Z plane of the coordinate axes depicted in the figures). However, it should be understood that other embodiments are contemplated and possible, such as embodiments in which the recoat motion axis 146 and the print motion axis 156 are located in different vertical planes.

In the embodiments described herein, the recoat assembly transverse actuator 144 and the print head actuator 154 may be, for example and without limitation, mechanical actuators, electro-mechanical actuators, pneumatic actuators, hydraulic actuators, or any other actuator suitable for providing linear motion. Suitable actuators may include, without limitation, worm drive actuators, ball screw actuators, pneumatic pistons, hydraulic pistons, electro-mechanical linear actuators, or the like. In one particular embodiment, the recoat assembly transverse actuator 144 and the print head actuator 154 are linear actuators manufactured, for example, by Aerotech® Inc. of Pittsburgh, Pennsylvania, such as the PRO225LM Mechanical Bearing, Linear Motor Stage.

In embodiments, the recoat assembly transverse actuator 144 and the print head actuator 154 may each be a cohesive sub-system that is affixed to the rail 180, such as when the recoat assembly transverse actuator 144 and the print head actuator 154 are PRO225LM Mechanical Bearing, Linear Motor Stages, for example. However, it should be understood that other embodiments are contemplated and possible, such as embodiments where the recoat assembly transverse actuator 144 and the print head actuator 154 comprise multiple components that are individually assembled onto the rail 180 to form the recoat assembly transverse actuator 144 and the print head actuator 154, respectively.

Still referring to FIG. 1, the recoat assembly 200 is coupled to the recoat assembly transverse actuator 144 such that the recoat assembly 200 is positioned below (i.e., in the −Z direction of the coordinate axes depicted in the figures) the first guide 182 and the second guide 184. When the actuator assembly 102 is positioned over the cleaning station 110, the build platform 120, and the supply platform 130 as depicted in FIG. 1, the recoat assembly 200 is situated on the working axis 116 of the additive manufacturing system 100. Thus, bi-directional actuation of the recoat assembly transverse actuator 144 along the recoat motion axis 146 affects bi-directional motion of the recoat assembly 200 on the working axis 116 of the additive manufacturing system 100. In the embodiment of the actuator assembly 102 depicted in FIG. 1, the recoat assembly 200 is coupled to the recoat assembly transverse actuator 144 with a support bracket 176 such that the recoat assembly 200 is positioned on the working axis 116 of the additive manufacturing system 100 while still providing clearance between rail 180 of the actuator assembly 102 and the build platform 120 and the supply platform 130. In some embodiments described herein, the recoat assembly 200 may be fixed in directions orthogonal to the recoat motion axis 146 and the working axis 116 (i.e., fixed along the +/−Z axis and/or fixed along the +/−Y axis).

Similarly, the print head 150 is coupled to the print head actuator 154 such that the print head 150 is positioned below (i.e., in the −Z direction of the coordinate axes depicted in the figures) the first guide 182 and the second guide 184. When the actuator assembly 102 is positioned over the cleaning station 110, the build platform 120, and the supply platform 130 as depicted in FIG. 1, the print head 150 is situated on the working axis 116 of the additive manufacturing system 100. Thus, bi-directional actuation of the print head actuator 154 along the print motion axis 156 affects bi-directional motion of the print head 150 on the working axis 116 of the additive manufacturing system 100. In the embodiment of the actuator assembly 102 depicted in FIG. 1, the print head 150 is coupled to the print head actuator 154 with a support bracket 174 such that the print head 150 is positioned on the working axis 116 of the additive manufacturing system 100 while still providing clearance between rail 180 of the actuator assembly 102 and the build platform 120 and the supply platform 130. In some embodiments described herein, the print head 150 may be fixed in directions orthogonal to the print motion axis 156 and the working axis 116 (i.e., fixed along the +/−Z axis and/or fixed along the +/−Y axis).

While FIG. 1 schematically depicts an embodiment of an actuator assembly 102 which comprises a first guide 182 and a second guide 184 with the recoat assembly transverse actuator 144 and the print head actuator 154 mounted thereto, respectively, it should be understood that other embodiments are contemplated and possible, such as embodiments which comprise more than two guides and more than two actuators. It should also be understood that other embodiments are contemplated and possible, such as embodiments which comprise the print head and the recoat assembly 200 on the same actuator.

Figure 2:
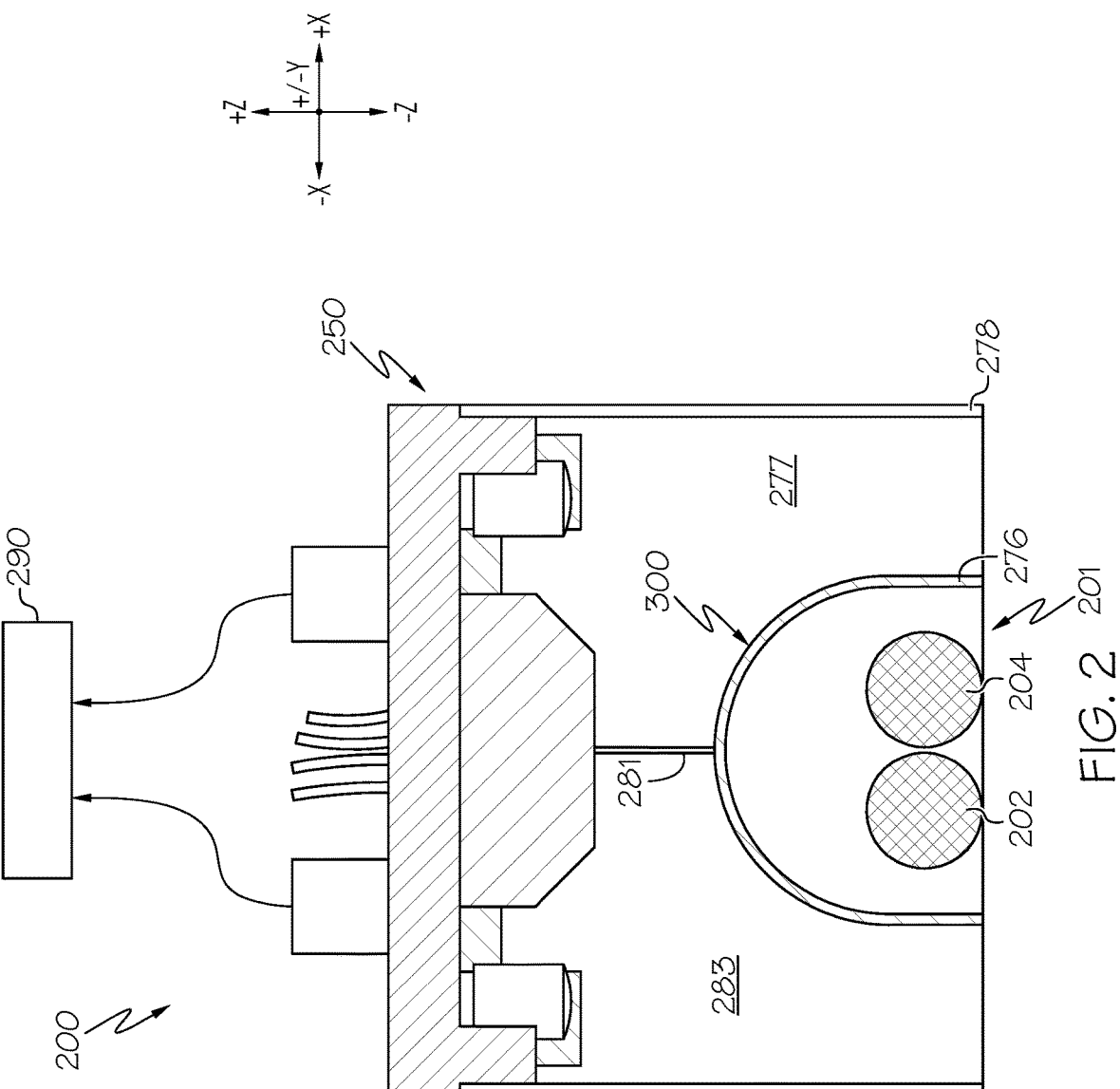
FIG. 2 schematically depicts a cross section view of a vacuum and a recoat assembly of the additive manufacturing system of FIG. 1, according to one or more embodiments shown and described herein.

Referring now to FIG. 2, in some embodiments, the recoat assembly 200 includes a base member 250 coupled to the recoat assembly transverse actuator 144 (FIG. 1), which moves the base member 250 in the lateral direction (i.e., in the +/−X axis). As referred to herein, the base member 250 may include any suitable structure of the recoat assembly 200 coupled to the recoat assembly transverse actuator 144, and may include a housing, a plate, or the like.

The recoat assembly 200 includes a powder spreading member 201. In embodiments, the powder spreading member 201 includes one or more rollers such as a first roller 202 and a second roller 204. In embodiments, the first roller 202 is positioned rearward of the second roller 204 (i.e., in the −X direction as depicted). In these embodiments, the first roller 202 may generally be referred to as the "rear" roller, and the second roller 204 may be referred to as the "front" roller.

Although not shown, it should be appreciated that, in some embodiments, the recoat assembly 200 further includes a first rotational actuator coupled to the first roller 202, and a second rotational actuator coupled to the second roller 204. In some embodiments, the first rotational actuator and the second rotational actuator are spaced apart from and coupled to the first roller 202 and the second roller 204, respectively, through a belt, a chain, or the like. In some embodiments, the recoat assembly 200 may include a single rotational actuator coupled to both the first roller 202 and the second roller 204. The first rotational actuator is configured to rotate the first roller 202 about a first rotation axis and the second rotational actuator is configured to rotate the second roller 204 about a second rotation axis. The first rotation axis and the second rotation axis are generally parallel to one another and are spaced apart from one another in the +/−X axis. The first roller 202 and the second roller 204 may be rotated in a "rotation direction" (e.g., a clockwise direction from the perspective shown in FIG. 2) and/or a "counter-rotation direction" that is the opposite of the rotation direction (e.g., a counter-clockwise direction from the perspective shown in FIG. 2). The first roller 202 and the second roller 204 can be rotated in the same direction or may be rotated in opposite directions from one another. The first rotational actuator and the second rotational actuator may include any suitable actuator for inducing rotation of the first roller 202 and the second roller 204, such as and without limitation, alternating current (AC) or direct current (DC) brushless motors, linear motors, servo motors, stepper motors, pneumatic actuators, hydraulic actuators, or the like.

Referring still to FIG. 2, in some embodiments, the recoat assembly 200 is in fluid communication with a vacuum 290. In particular, in embodiments, the vacuum 290 is in fluid communication with at least a portion of the base member 250 of the recoat assembly 200. The vacuum 290 is generally operable to draw build material 31 (FIG. 1) that is airborne out of the recoat assembly 200 and/or control the flow of aerosolized build material 31 within the additive manufacturing system 100 (FIG. 1). In particular, as the first roller 202 and the second roller 204 fluidize or mobilize build material 31, some build material 31 will become airborne, unless controlled, and may foul components of the additive manufacturing system 100. The vacuum 290, in embodiments, may include any suitable device for applying a negative and/or a positive pressure to the recoat assembly 200, such as a pump or the like.

As depicted in FIG. 2, the base member 250 generally includes a primary containment housing 276 that at least partially encapsulates the first roller 202 and the second roller 204. The base member 250 also includes a secondary containment housing 278. The secondary containment housing 278 is spaced apart from the primary containment housing 276 and at least partially encapsulates the primary containment housing 276. The primary containment housing 276 and the secondary containment housing 278 generally define an intermediate cavity 277 that is disposed between the primary containment housing 276 and the secondary containment housing 278. In embodiments, the vacuum 290 is in fluid communication with the intermediate cavity 277 and is operable to draw airborne build material 31 from the intermediate cavity 277. In some embodiments, the intermediate cavity 277 is a forward intermediate cavity 277, and the secondary containment housing 278 and the primary containment housing 276 define a rear intermediate cavity 283 separated from the forward intermediate cavity 277 by a bulkhead 281. By separating the forward intermediate cavity 277 and the rear intermediate cavity 283, different vacuum pressures may be applied to the forward intermediate cavity 277 and the rear intermediate cavity 283. For example, the rear intermediate cavity 283 may pass over generally settled build material 31, and accordingly, it may be desirable to apply less vacuum pressure at the rear intermediate cavity 283 to avoid disturbing the settled build material 31.

As described herein, some build material 31 may become airborne when aerosolized by the first roller 202 and the second roller 204. As such, the build material 31 that is airborne may be thrown over the first roller 202 and the second roller 204 within the primary containment housing 276 from one side of the first roller 202 and the second roller 204 in a moving direction of the recoat assembly 200 to an opposite side of the first roller 202 and the second roller 204. This results in uncontrolled re-deposition of build material 31 on the build area 124 (FIG. 1) at the opposite side of the first roller 202 and the second roller 204 and, specifically, a non-uniform layer of build material 31. Accordingly, various embodiments of containment mechanisms for preventing build material 31 from being re-deposited onto an opposite side of the first roller 202 and the second roller 204 may be provided within the primary containment housing 276.

Figure 3:
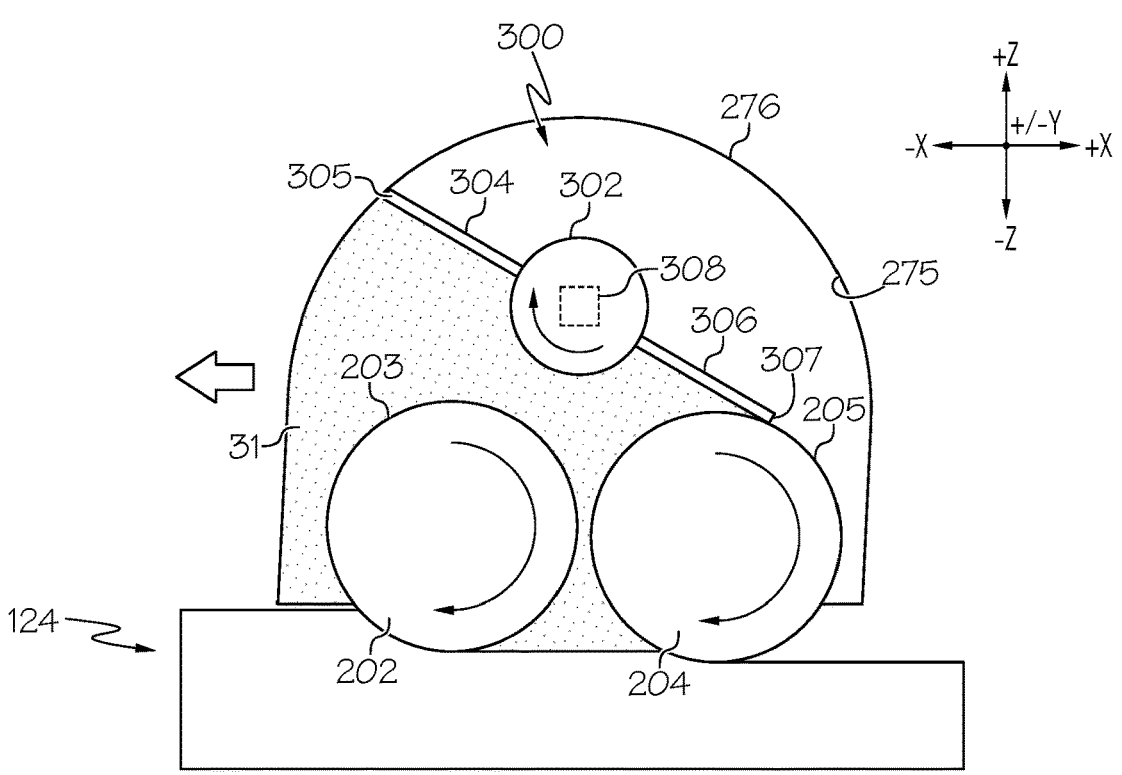
FIG. 3 schematically depicts a partial side view of the recoat assembly of FIG. 2 including an embodiment of a containment mechanism in a first position, according to one or more embodiments shown and described herein.
Figure 4:
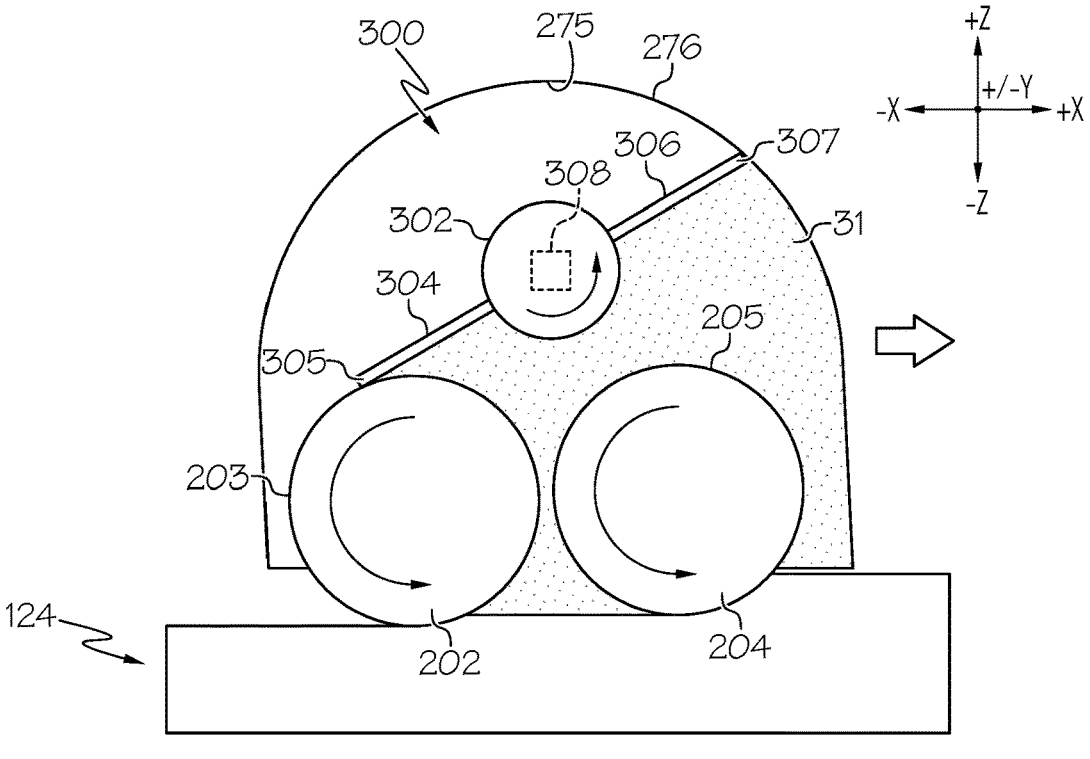
FIG. 4 schematically depicts a partial side view of the recoat assembly of FIG. 2 including the containment mechanism of FIG. 3 in a second position, according to one or more embodiments shown and described herein.

Referring now to FIGS. 3 and 4, an embodiment of a containment mechanism 300 positioned within the primary containment housing 276 is depicted. The containment mechanism 300 includes a central shaft 302 mounted within the primary containment housing 276 and rotatably fixed along the +/−Y axis. Although not shown, one or more mounting attachments may be provided for mounting the central shaft 302 to the primary containment housing 276, one or more end walls of the secondary containment housing 278 (FIG. 2), and/or one or more end walls of the base member 250 (FIG. 2). The containment mechanism 300 further includes one or more flanges extending in a radial direction from the central shaft 302. As shown in FIGS. 3 and 4, the containment mechanism 300 includes a first flange 304 and a second flange 306 extending in opposite radial directions from the central shaft 302. In embodiments, the first flange 304 and the second flange 306 are plate-shaped members extending parallel to the +/−Y axis within the primary containment housing 276. The containment mechanism 300 further includes a motor 308 operable to rotate the central shaft 302 and position the containment mechanism 300 between a first position, as shown in FIG. 3, and a second position, as shown in FIG. 4.

As the recoat assembly 200 moves across the build area 124 in −X direction, as shown in FIG. 3, the first roller 202 and the second roller 204 rotate in the counter-rotation direction. As a result, it should be appreciated that build material 31 may be aerosolized and thrown airborne into the primary containment housing 276 and above the first roller 202 and the second roller 204 from one side of the primary containment housing 276 to an opposite side of the primary containment housing 276. Accordingly, to prevent the build material 31 that has been aerosolized from being re-deposited onto the build area 124 proximate the second roller 204 as the first roller 202 and the second roller 204 rotate in the counter-rotation direction, the containment mechanism 300 is positioned into the first position. Specifically, in the first position, the motor 308 is operated to rotate the central shaft 302 in a clockwise direction from the perspective shown in FIG. 3 such that the first flange 304 extends from the central shaft 302 toward an inner surface 275 of the primary containment housing 276, and the second flange 306 extends from the central shaft 302 toward the second roller 204. In some embodiments, an end 305 of the first flange 304 opposite the central shaft 302 contacts the inner surface 275 of the primary containment housing 276. In other embodiments, the end 305 of the first flange 304 opposite the central shaft 302 is positioned within a threshold distance from the inner surface 275 of the primary containment housing 276. Moreover, in the first position, in some embodiments, an end 307 of the second flange 306 opposite the central shaft 302 contacts an outer surface 205 of the second roller 204 (FIG. 3). In other embodiments, the end 307 of the second flange 306 opposite the central shaft 302 is positioned within a threshold distance from the outer surface 205 of the second roller 204. By positioning the containment mechanism 300 in the first position as the recoat assembly 200 moves in the −X direction, aerosolized build material 31 entering the primary containment housing 276 is contained in front of (i.e., in the −X direction) the second roller 204 and prevented from being re-deposited onto the build area 124 rearward of (i.e., in the +X direction) the second roller 204.

Similarly, as the recoat assembly 200 moves across the build area 124 in +X direction, as shown in FIG. 4, the first roller 202 and the second roller 204 rotate in the counter-rotation direction. As a result, it should be appreciated that build material 31 that is aerosolized may be thrown airborne into the primary containment housing 276 and above the first roller and the second roller 204 in an opposite direction from one side of the primary containment housing 276 to an opposite side of the primary containment housing 276. Accordingly, to prevent the aerosolized build material 31 from being re-deposited onto the build area 124 proximate the first roller 202 as the first roller 202 and the second roller 204 rotate in the rotation direction, the containment mechanism 300 is positioned into the second position. Specifically, in the second position, the motor 308 is operated to rotate the central shaft 302 in a counter-clockwise direction from the perspective shown in FIG. 4 such that the first flange 304 extends from the central shaft 302 toward the first roller 202, and the second flange 306 extends from the central shaft 302 toward the inner surface 275 of the primary containment housing 276. In embodiments, the end 305 of the first flange 304 opposite the central shaft 302 contacts an outer surface 203 of the first roller 202 (FIG. 4). In other embodiments, the end 305 of the first flange 304 opposite the central shaft 302 is positioned within a threshold distance from the outer surface 203 of the first roller 202. Moreover, in the second position, in embodiments, the end 307 of the second flange 306 opposite the central shaft 302 contacts the inner surface 275 of the primary containment housing 276. In other embodiments, the end 307 of the second flange 306 opposite the central shaft 302 is positioned within a threshold distance from the inner surface 275 of the primary containment housing 276. By positioning the containment mechanism 300 in the second position as the recoat assembly 200 is moving in the +X direction, build material 31 that is aerosolized that enters the primary containment housing 276 is contained in front of (i.e., in the +X direction) of the first roller 202 and prevented from being re-deposited onto the build area 124 rearward of (i.e., in the −X direction) the first roller 202.

Figure 5:
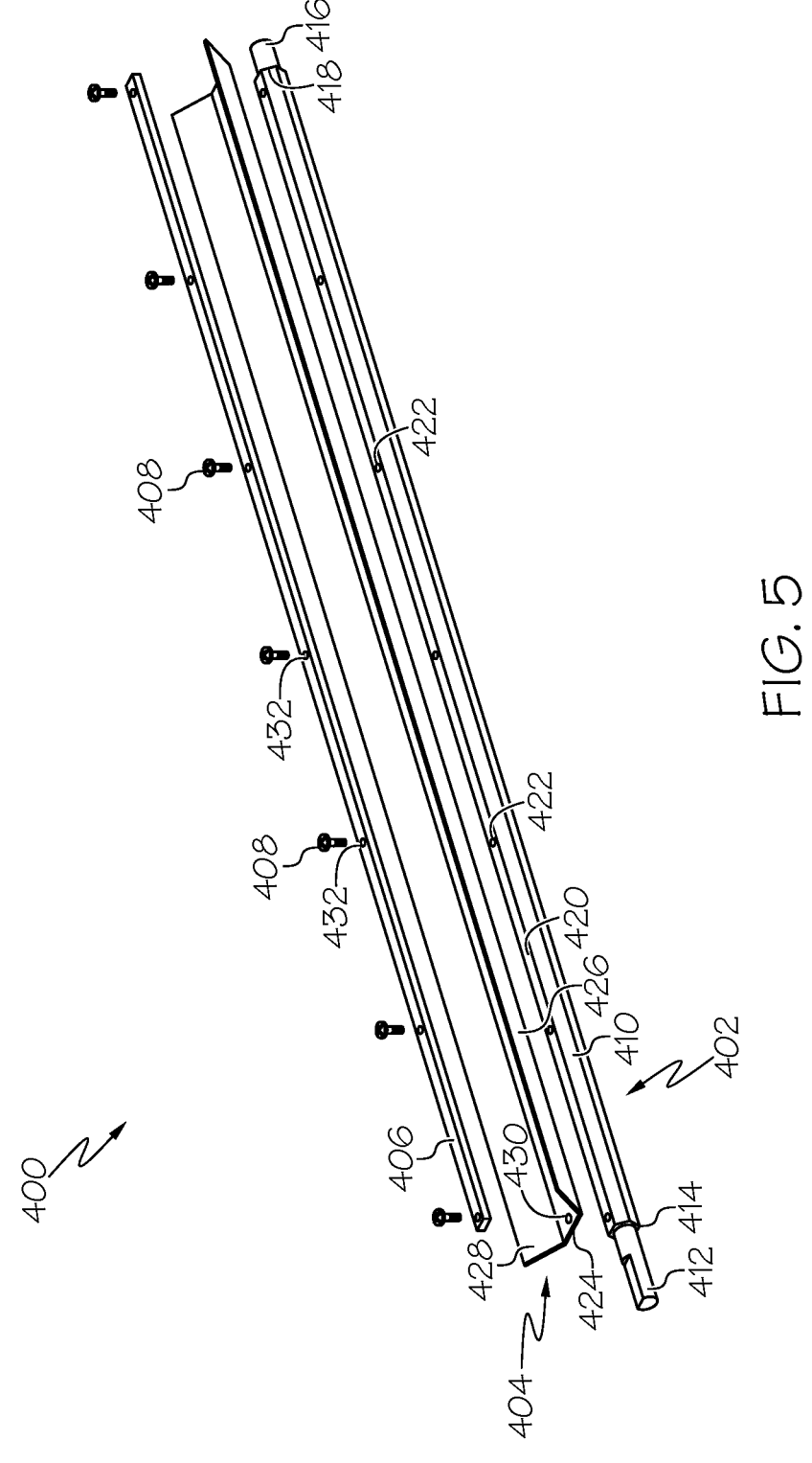
FIG. 5 schematically depicts an exploded view of an embodiment of a containment mechanism, according to one or more embodiments shown and described herein.

Referring now to FIG. 5, an exploded view of another embodiment of a containment mechanism 400 is depicted. The containment mechanism 400 includes a central shaft 402, a flange 404 provided on a surface of the central shaft 402, an attachment plate 406 positioned on the flange 404 opposite the central shaft 402, and one or more fasteners 408 for securing the flange 404 to the central shaft 402.

With more particularity, the central shaft 402 includes a shaft body 410, a first receiving member 412 extending from a first end 414 of the shaft body 410, and a second receiving member 416 extending from a second end 418 of the shaft body 410 opposite the first end 414. It should be appreciated that the first receiving member 412 and the second receiving member 416 may be received within corresponding slots or openings formed in the base member 250 (FIG. 2) to rotatably fix the central shaft 402 within the primary containment housing 276 (FIG. 2). The shaft body 410 includes a planar bottom surface 420 extending between the first end 414 and the second end 418 of the shaft body 410. One or more apertures 422 are formed in the planar bottom surface 420. As shown in FIG. 5, a plurality of apertures 422 are formed in the planar bottom surface 420 and spaced apart from one another.

With respect to the flange 404, the flange 404 includes a flange base 424, a first angular flange portion 426, and a second angular flange portion 428. The first angular flange portion 426 and the second angular flange portion 428 extend outwardly from opposite sides of the flange base 424. The first angular flange portion 426 and the second angular flange portion 428 extend from the flange base 424 at an angle between 90 degrees and 180 degrees. In some embodiments, the first angular flange portion 426 and the second angular flange portion 428 extend from the flange base 424 at an oblique angle such as, for example, between 100 degrees and 170 degrees. In some embodiments, the angle at which the first angular flange portion 426 and the second angular flange portion 428 extend from the flange base 424 is between 120 degrees and 150 degrees. The angle at which the first angular flange portion 426 extends from the flange base 424 may be the same or different from the angle at which the second angular flange portion 428 extends from the flange base 424. One or more apertures 430 are formed in the flange base 424. In some embodiments, a plurality of apertures 430 are formed in the flange base 424 corresponding to the number of apertures 422 formed in the planar bottom surface 420 of the shaft body 410.

The attachment plate 406 is shown provided at a side of the flange 404 opposite the central shaft 402. As shown, a plurality of apertures 432 are formed in the attachment plate 406 corresponding to the apertures 430 formed in the flange base 424 and the apertures 422 formed in the central shaft 402. Accordingly, when the flange base 424 is positioned on the planar bottom surface 420 of the shaft body 410 and the attachment plate 406 is positioned on the flange base 424 between the angular flange portions 426, 428 and opposite the central shaft 402, the fasteners 408 may be inserted through corresponding apertures 432 formed in the attachment plate 406, apertures 430 formed in the flange 404, and apertures 422 formed in the central shaft 402, to secure the flange 404 to the central shaft 402.

Figures 6, 7:
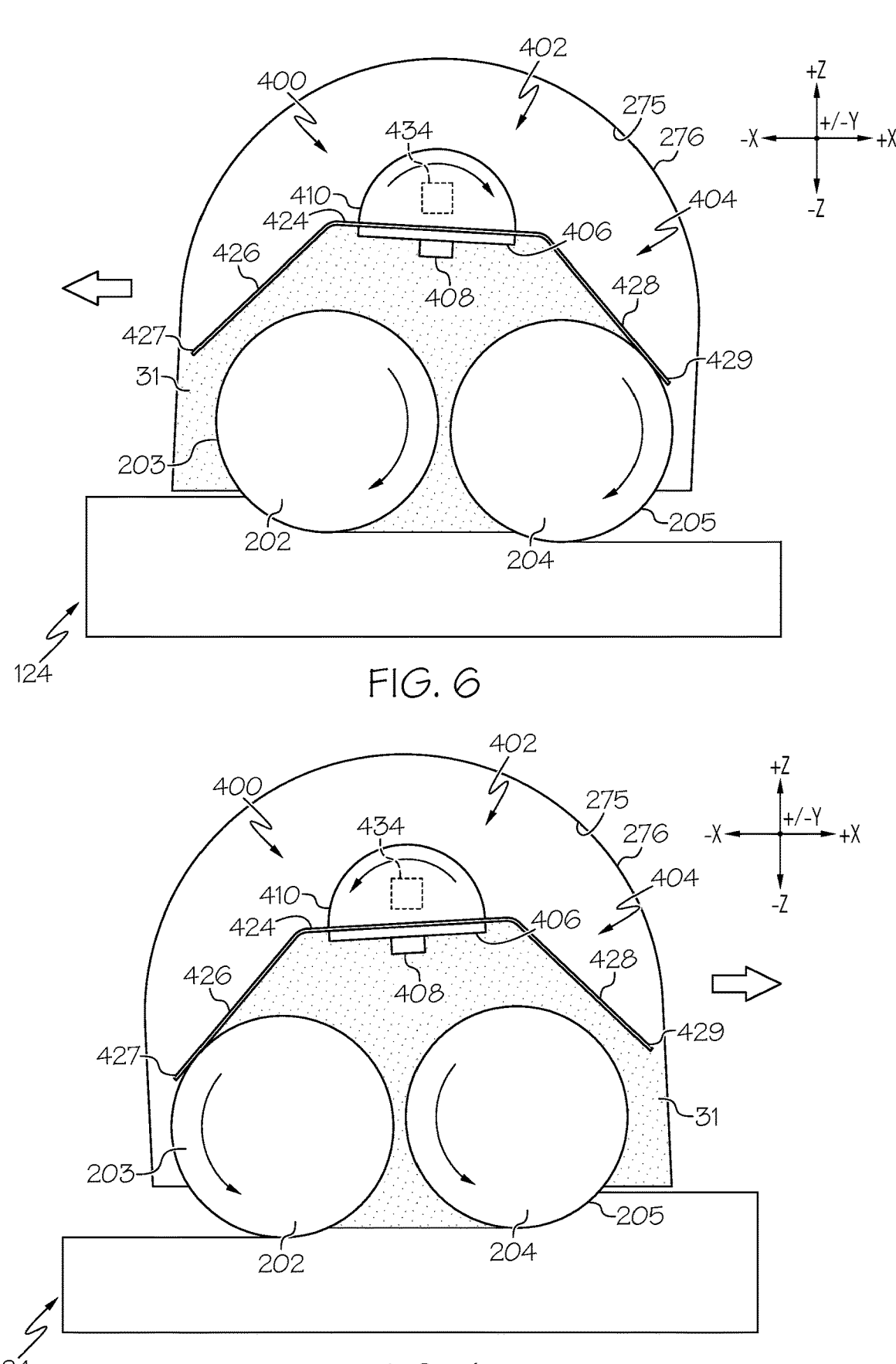
FIG. 6 schematically depicts a partial side view of the recoat assembly of FIG. 2 including the containment mechanism of FIG. 5 in a first position, according to one or more embodiments shown and described herein.
FIG. 7 schematically depicts a partial side view of the recoat assembly of FIG. 2 including the containment mechanism of FIG. 5 in a second position, according to one or more embodiments shown and described herein.

Referring now to FIGS. 6 and 7, the containment mechanism 400 is shown positioned within the primary containment housing 276 and positionable between a first position with the recoat assembly 200 moving in the −X direction (FIG. 6) and a second position with the recoat assembly 200 moving in the +X direction (FIG. 7). As with the containment mechanism 300 depicted in FIGS. 3 and 4 and discussed herein, the containment mechanism 400 may include a motor 434 for rotating the central shaft 402 to position the containment mechanism 400 between the first position and the second position.

As shown in FIG. 6, with the containment mechanism 400 in the first position, the first angular flange portion 426 extends toward the inner surface 275 of the primary containment housing 276 and the second angular flange portion 428 extends toward the outer surface 205 of the second roller 204. As discussed herein, an end 427 of the first angular flange portion 426 may contact the inner surface 275 of the primary containment housing 276 or be spaced apart from the inner surface 275 of the primary containment housing 276 by a threshold distance. Similarly, an end 429 of the second angular flange portion 428 may contact the outer surface 205 of the second roller 204 or be spaced apart from the outer surface 205 of the second roller 204 by a threshold distance.

Similarly, as shown in FIG. 7, with the containment mechanism 400 in the second position, the first angular flange portion 426 extends toward the outer surface 203 of the first roller 202 and the second angular flange portion 428 extends toward the inner surface 275 of the primary containment housing 276. As discussed herein, the end 427 of the first angular flange portion 426 may contact the outer surface 203 of the first roller 202 or be spaced apart from the outer surface 203 of the first roller 202 by a threshold distance. Similarly, the end 429 of the second angular flange portion 428 may contact the inner surface 275 of the primary containment housing 276 or be spaced apart from the inner surface 275 of the primary containment housing 276 by a threshold distance.

Figure 8:
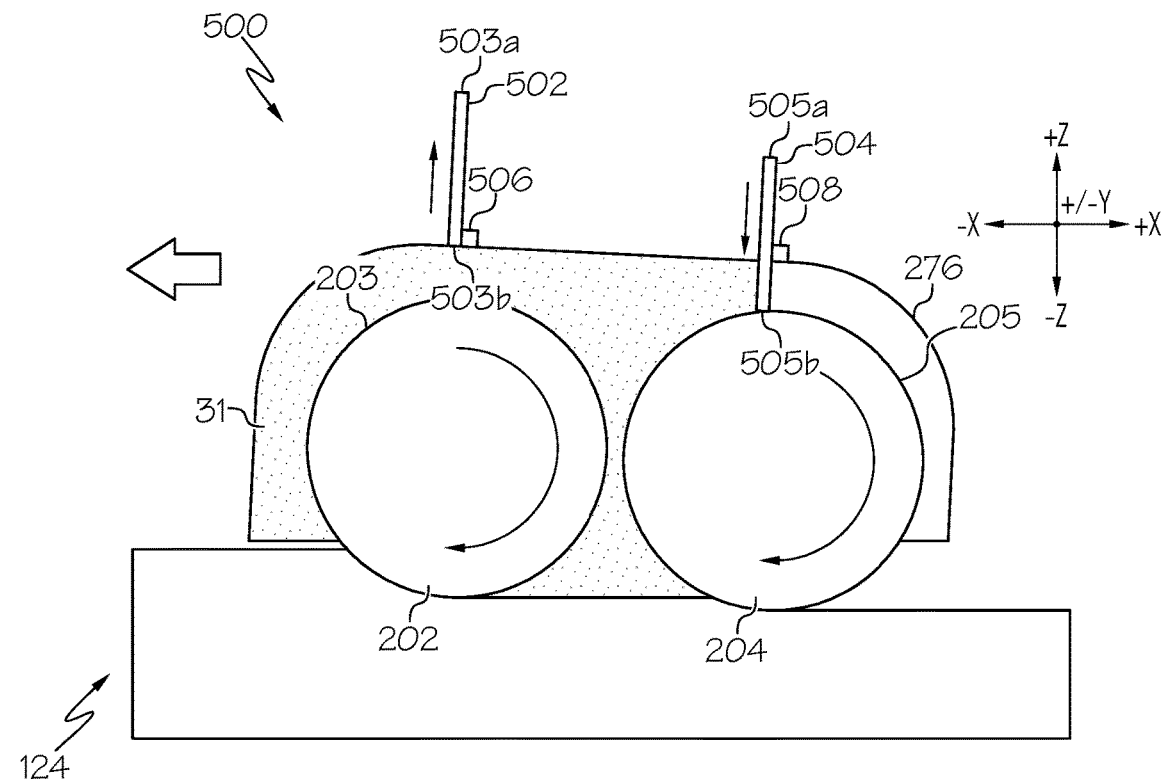
FIG. 8 schematically depicts a partial side view of the recoat assembly of FIG. 2 including an embodiment of a containment mechanism in a first position, according to one or more embodiments shown and described herein.
Figure 9:
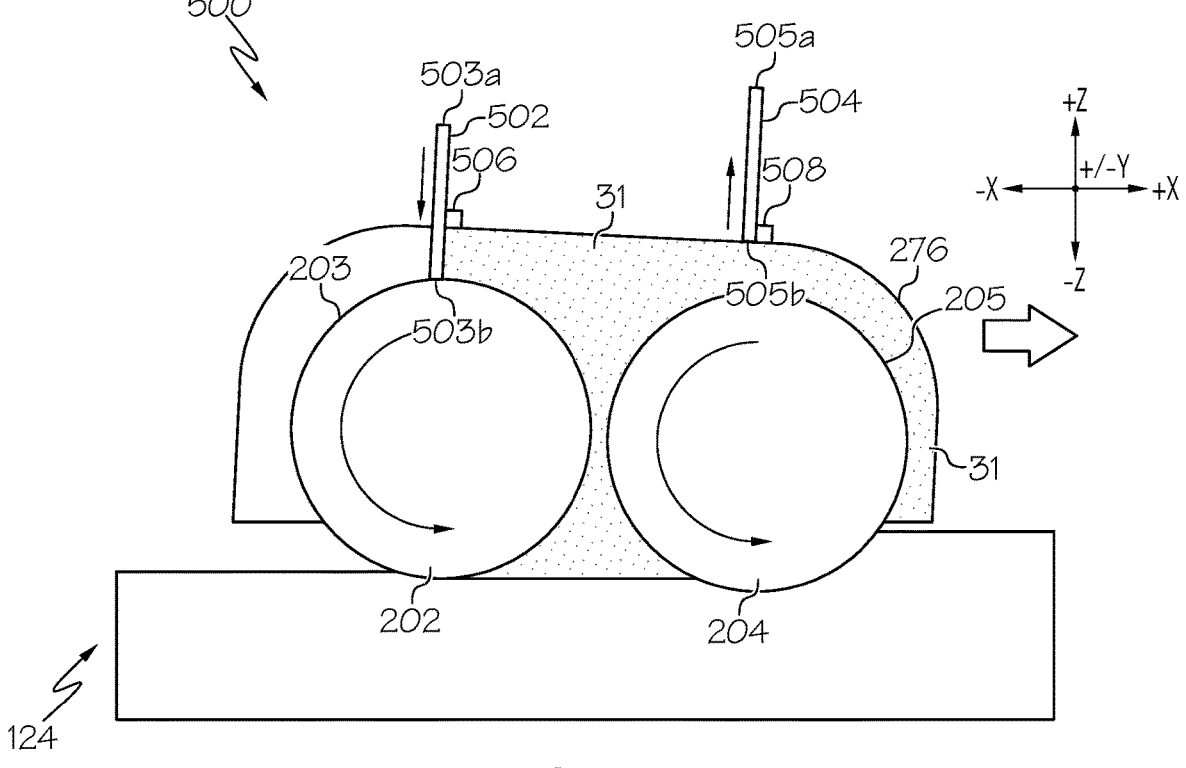
FIG. 9 schematically depicts a partial side view of the recoat assembly of FIG. 2 including the containment mechanism of FIG. 8 in a second position, according to one or more embodiments shown and described herein.

Referring now to FIGS. 8 and 9, an embodiment a containment mechanism 500 positioned within the primary containment housing 276 is depicted. In embodiments, the containment mechanism 500 includes a first flat 502 and a second flat 504, each extending through the primary containment housing 276 above a respective one of the first roller 202 and the second roller 204. In embodiments, the first flat 502 extends through the primary containment housing 276 above the first roller 202 and the second flat 504 extends through the primary containment housing 276 above the second roller 204. It should be appreciated that the first flat 502 and the second flat 504 are each plate-shaped members and extend in a direction parallel to the +/−Y axis depicted in the drawings along a length of the first roller 202 and the second roller 204, respectively. The first flat 502 has an upper end 503a and a lower end 503b opposite the upper end 503a, and the second flat 504 has an upper end 505a and a lower end 505b opposite the upper end 505a.

As described herein, the first flat 502 and the second flat 504 are each positionable between a first or raised position and a second or lowered position. As such, the first flat 502 is shown in the raised position in FIG. 8 such that the first flat 502 is moved away from the first roller 202 and is shown in the lowered position in FIG. 9 such that the first flat 502 is moved toward the first roller 202 with the lower end 503b of the first flat 502 contacting the outer surface 203 of the first roller 202. Similarly, the second flat 504 is shown in the lowered position in FIG. 8 such that the second flat 504 is moved toward the second roller 204 with the lower end 505*b* of the second flat 504 contacting the outer surface 205 of the second roller 204 and is shown in the raised position in FIG. 9 such that the second flat 504 is moved away from the second roller 204.

The containment mechanism 500 further includes one or more flat actuators for positioning the first flat 502 and the second flat 504 between the raised position and the lowered position. In some embodiments (not illustrated), the containment mechanism 500 includes a single flat actuator for moving both the first flat 502 and the second flat 504 independently of one another. In other embodiments, the containment mechanism 500 includes a first flat actuator 506 for moving the first flat 502 and a second flat actuator 508 for moving the second flat 504 (as shown in FIGS. 8 and 9).

The first flat actuator 506 and the second flat actuator 508 engage a respective one of the first flat 502 and the second flat 504 in any suitable manner. As a non-limiting example, the first flat actuator 506 and the second flat actuator 508 each include a rack and the first flat 502 and the second flat 504 each include a pinion gear for engaging the rack and positioning the first flat 502 and the second flat 504 between the raised position and the lowered position, or vice versa. As another non-limiting example, the first flat actuator 506 and the second flat actuator 508 each include a pulley system for engaging and positioning the first flat 502 and the second flat 504 between the raised position and the lowered position. However, it should be appreciated that other suitable mechanisms for moving the first flat 502 and the second flat 504 between the raised position and the lowered position are contemplated and within the scope of the present disclosure.

In use, with respect to FIG. 8, the recoat assembly 200 moves across the build area 124 in the −X direction and the first roller 202 and the second roller 204 rotate in the counter-rotation direction. To prevent build material 31 that is aerosolized from being thrown airborne over the second roller 204 and onto a rear side of the recoat assembly 200, the first flat actuator 506 positions the first flat 502 into the raised position such that the lower end 503*b* of the first flat 502 is spaced apart from the outer surface 203 of the first roller 202, and the second flat actuator 508 positions the second flat 504 into the lowered position such that the lower end 505*b* of the second flat 504 contacts the outer surface 205 of the second roller 204. This also aids in cleaning build material off the second roller 204 by scraping the lower end 505*b* of the second flat 504 against the outer surface 205 of the second roller 204.

Alternatively, with respect to FIG. 9, the recoat assembly 200 moves across the build area 124 in the +X direction and the first roller 202 and the second roller 204 rotate in the rotation direction. To prevent aerosolized build material 31 from being thrown airborne over the first roller 202 and onto a rear side of the recoat assembly 200, the second flat actuator 508 positions the second flat 504 into the raised position such that the lower end 505*b* of the second flat 504 is spaced apart from the outer surface 205 of the second roller 204, and the first flat actuator 506 positions the first flat 502 into the lowered position such that the lower end 503*b* of the first flat 502 contacts the outer surface 203 of the first roller 202. This also aids in cleaning build material off the first roller 202 by scraping the lower end 503*b* of the first flat 502 against the outer surface 203 of the first roller 202. Accordingly, it should be appreciated that the first flat actuator 506 and the second flat actuator 508 are operated to alternatingly position the first flat 502 and the second flat 504 in an appropriate position based on the moving direction of the recoat assembly 200.

Figures 10, 11:
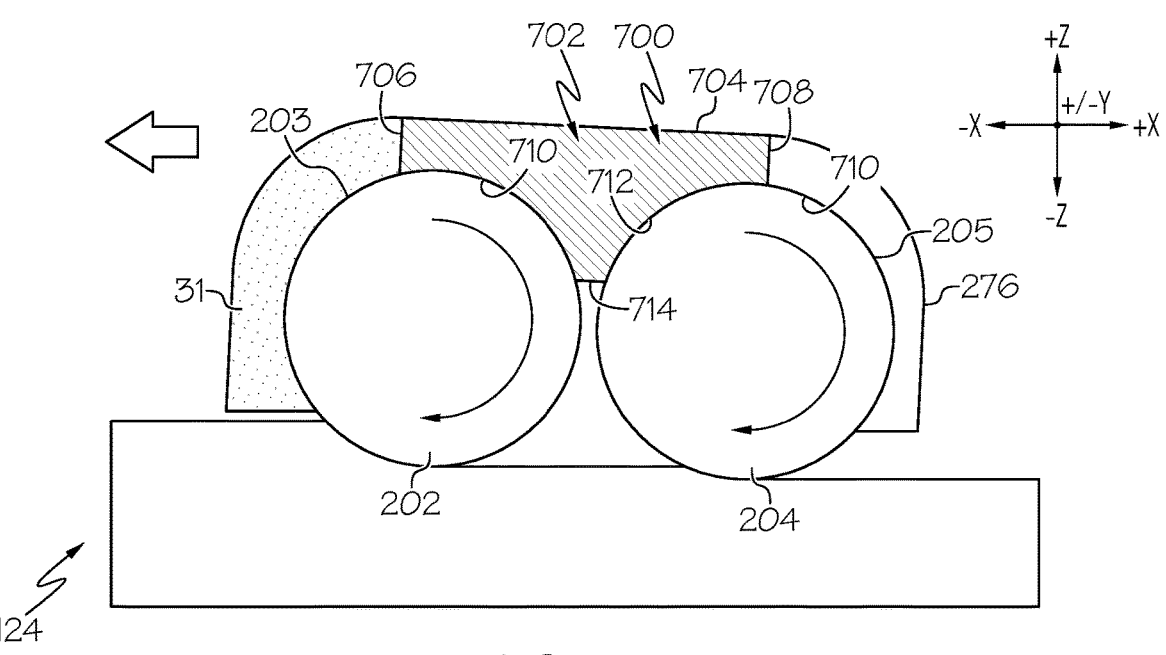
FIG. 10 schematically depicts a partial side view of the recoat assembly of FIG. 2 including an embodiment of a containment mechanism, according to one or more embodiments shown and described herein.
FIG. 11 schematically depicts a partial side view of the recoat assembly of FIG. 2 including an embodiment of a containment mechanism, according to one or more embodiments shown and described herein.

Referring now to FIG. 10, an embodiment of a containment mechanism 600 is depicted. In embodiments, the containment mechanism 600 includes a first scraper assembly 602 and a second scraper assembly 604, each extending through the primary containment housing 276 above a respective one of the first roller 202 and the second roller 204. In embodiments, the first scraper assembly 602 extends through the primary containment housing 276 above the first roller 202 and the second scraper assembly 604 extends through the primary containment housing 276 above the second roller 204. In embodiments, the first scraper assembly 602 and the second scraper assembly 604 are coupled to the secondary containment housing 278 and extend therethrough such that the first scraper assembly 602 and the second scraper assembly 604 are accessible from an exterior of the recoat assembly 200.

In embodiments, the first scraper assembly 602 includes a first scraper blade 606, a first scraper blade holder 608 for holding the first scraper blade 606, and a first scraper adjustment device 610 for adjusting a vertical position of the first scraper blade 606 relative to the first roller 202. The first scraper blade 606 extends in a direction parallel to the +/−Y axis depicted in the drawings along a length of the first roller 202. The first scraper blade 606 has an upper end 607*a* and a lower end 607*b* opposite the upper end 607*a*.

In embodiments, the first scraper blade holder 608 also extends in the direction parallel to the +/−Y axis depicted in the drawings and has a recess 612 formed in a lower end 614 thereof in which the upper end 607*a* of the first scraper blade 606 is received. The first scraper blade 606 may be secured within the recess 612 formed in the first scraper blade holder 608 by any suitable means such as, for example, one or more fasteners extending through the first scraper blade holder 608 to contact or engage the first scraper blade 606. As such, the first scraper blade 606 may be removed from the first scraper blade holder 608 and replaced if the first scraper blade 606 becomes worn or damaged. In other embodiments, the first scraper blade 606 and the first scraper blade holder 608 may be formed as a one-piece, monolithic structure such that the first scraper blade 606 and the first scraper blade holder 608 must be replaced if either the first scraper blade 606 or the first scraper blade holder 608 become worn or damaged.

In embodiments, the first scraper adjustment device 610 includes a rod 616, an adjuster 618 engaging an end of the rod 616 on a side of the secondary containment housing 278 opposite the primary containment housing 276, and a biasing member 620 such as, for example, a spring or the like, encircling the rod 616 between the secondary containment housing 278 and the first scraper blade holder 608. In use, the adjuster 618 may be operated such as, for example, by manual rotation or some other mechanical device. Rotation of the adjuster 618 in a first rotation direction causes the rod 616 to move in the +Z direction and, thus, move the first scraper blade 606 away from the first roller 202. As the rod 616 moves in the +Z direction, the biasing member 620 compresses between the secondary containment housing 278 and the first scraper blade holder 608 to increase a damping effect of the rod 616. Accordingly, as the adjuster 618 is rotated in a second rotation direction opposite the first rotation direction, the rod 616 moves in the −Z direction and, thus, moves the first scraper blade 606 toward from the first roller 202. As the rod 616 moves in the −Z direction, the biasing member 620 extends between the secondary containment housing 278 and the first scraper blade holder 608 to decrease a damping effect of the rod 616.

Similarly, the second scraper assembly 604 includes a second scraper blade 622, a second scraper blade holder 624 for holding the second scraper blade 622, and a second scraper adjustment device 626 for adjusting a vertical position of the second scraper blade 622 relative to the second roller 204. It should be appreciated that operation of the second scraper assembly 604 is the same as the first scraper assembly 602. As such, additional description of the structure and operation of the second scraper assembly 604 is not provided herein.

Referring now to FIG. 11, an embodiment of a containment mechanism 700 is depicted. The containment mechanism 700 includes a block 702 provided between the first roller 202, the second roller 204, and the primary containment housing 276. In embodiments, the block 702 may be formed from a soft metal such as, for example, aluminum, brass, copper, lead, and the like. In other embodiments, the block 702 may be formed from a compressible material other than metal such as, for example, rubber, foam, plastic, and the like. In embodiments, the block 702 is shaped by any suitable means such as, for example, by being cut, shaved, or the like, to fit within a space formed between the first roller 202, the second roller 204, and the primary containment housing 276. As such, the block 702 has an upper surface 704, a first side wall 706 and a second side wall 708 opposite the first side wall 706 extending from the upper surface 704, a first concave surface 710 and a second concave surface 712 opposite the first concave surface 710 extending from the first side wall 706 and the second side wall 708, respectively, and a bottom surface 714 opposite the upper surface 704 extending between the first concave surface 710 and the second concave surface 712.

The block 702 extends in the direction parallel to the +/−Y axis depicted in the drawings along the length of the first roller 202 and the second roller 204. As such, the first roller 202 is received within a cutout defined by the first concave surface 710 and the second roller 204 is received within a cutout defined by the second concave surface 712. It should be appreciated that when the block 702 is positioned within the primary containment housing 276, the first concave surface 710 contacts the outer surface 203 of the first roller 202 and the second concave surface 712 contacts the outer surface 205 of the second roller 204 to prevent aerosolized build material 31 from passing over the first roller 202 and the second roller 204 during movement of the recoat assembly 200 across the build area 124.

Although the various embodiments of containment mechanisms described herein are utilized in recoat assemblies including a first roller and a second roller, it should be appreciated that the containment mechanisms may similarly be utilized in recoat assemblies including only a single roller without departing from the scope of the present disclosure.

From the above, it is to be appreciated that defined herein are recoat assemblies for an additive manufacturing system including a containment mechanism for preventing aerosolized build material from entering a primary containment housing at a first end thereof and being redeposited on a build area at an opposite end of the primary containment housing by traveling over a powder spreading member.

Further aspects of the embodiments described herein are provided by the subject matter of the following clauses:

A recoat assembly for an additive manufacturing system, the recoat assembly comprising: a base member movable in a first lateral direction and a second lateral direction opposite the first lateral direction, the base member including a primary containment housing; a powder spreading member coupled to the base member, the powder spreading member at least partially encapsulated by the primary containment housing; and a containment mechanism positionable into a first position when the base member is moving in the first lateral direction, and positionable into a second position different from the first position when the base member is moving in the second lateral direction.

The recoat assembly of any preceding clause, wherein the powder spreading member includes a first roller and a second roller rotatably coupled to the base member.

The recoat assembly of any preceding clause, wherein the containment mechanism includes a central shaft rotatably coupled to the base member, a first flange extending from the central shaft, and a second flange extending from the central shaft opposite the first flange.

The recoat assembly of any preceding clause, wherein, in the first position, an end of the first flange extends toward an inner surface of the primary containment housing and an end of the second flange extends toward an outer surface of the second roller, and wherein, in the second position, the end of the first flange extends toward an outer surface of the first roller and the end of the second flange extends toward the inner surface of the primary containment housing.

The recoat assembly of any preceding clause, wherein, in the first position, the end of the first flange contacts the inner surface of the primary containment housing and the end of the second flange contacts the outer surface of the second roller, and wherein, in the second position, the end of the first flange contacts the outer surface of the first roller and the end of the second flange contacts the inner surface of the primary containment housing.

The recoat assembly of any preceding clause, wherein the containment mechanism includes a central shaft rotatably coupled to the base member, a flange coupled to the central shaft and including a flange base, a first angular flange portion, and a second angular flange portion, the first angular flange portion and the second angular flange portion extending at an oblique angle from the flange base.

The recoat assembly of any preceding clause, wherein the containment mechanism includes a first flat and a second flat spaced apart from the first flat, the first flat and the second flat each movable through the primary containment housing between a raised position and a lowered position.

The recoat assembly of any preceding clause, wherein, in the lowered position, an end of the first flat and the second flat contacts a respective one of the first roller and the second roller.

The recoat assembly of any preceding clause, wherein, in the first position, the first flat is in the raised position and the second flat is in the lowered position, and wherein, in the second position, the first flat is in the lowered position and the second flat is in the raised position.

The recoat assembly of any preceding clause, wherein the base member includes a secondary containment housing that is spaced apart from and at least partially encapsulates the primary containment housing.

The recoat assembly of any preceding clause, wherein the containment mechanism includes a first scraper assembly and a second scraper assembly each extending through the secondary containment housing and extending toward a respective one of the first roller and the second roller, the first scraper assembly and the second scraper assembly each including a scraper blade that contacts a respective one of the first roller and the second roller.

An additive manufacturing system comprising: a recoat assembly comprising: a base member movable in a first lateral direction and a second lateral direction opposite the first lateral direction, the base member including a primary containment housing; a powder spreading member coupled to the base member, the powder spreading member at least partially encapsulated by the primary containment housing, the powder spreading member including a first roller and a second roller; and a containment mechanism positionable into a first position when the base member is moving in the first lateral direction, and positionable into a second position different from the first position when the base member is moving in the second lateral direction; and a build area positioned below the recoat assembly, the recoat assembly movable across the build area in the first lateral direction and the second lateral direction.

The additive manufacturing system of any preceding clause, wherein the containment mechanism includes a central shaft rotatably coupled to the base member, a first flange extending from the central shaft, and a second flange extending from the central shaft opposite the first flange.

The additive manufacturing system of any preceding clause, wherein, in the first position, an end of the first flange extends toward an inner surface of the primary containment housing and an end of the second flange extends toward an outer surface of the second roller, and wherein, in the second position, the end of the first flange extends toward an outer surface of the first roller and the end of the second flange extends toward the inner surface of the primary containment housing.

The additive manufacturing system of any preceding clause, wherein the containment mechanism includes a central shaft rotatably coupled to the base member, a flange coupled to the central shaft and including a flange base, a first angular flange portion, and a second angular flange portion, the first angular flange portion and the second angular flange portion extending at an oblique angle from the flange base.

The additive manufacturing system of any preceding clause, wherein the containment mechanism includes a first flat and a second flat spaced apart from the first flat, the first flat and the second flat each movable through the primary containment housing between a raised position and a lowered position, wherein, in the lowered position, an end of the first flat and the second flat contacts a respective one of the first roller and the second roller, wherein, in the first position, the first flat is in the raised position and the second flat is in the lowered position, and wherein, in the second position, the first flat is in the lowered position and the second flat is in the raised position.

The additive manufacturing system of any preceding clause, wherein the base member includes a secondary containment housing that is spaced apart from and at least partially encapsulates the primary containment housing, wherein the containment mechanism includes a first scraper assembly and a second scraper assembly each extending through the secondary containment housing and extending toward a respective one of the first roller and the second roller, the first scraper assembly and the second scraper assembly each including a scraper blade that contacts a respective one of the first roller and the second roller.

A method comprising: providing a recoat assembly comprising: a base member movable in a first lateral direction and a second lateral direction opposite the first lateral direction over a build area, the base member including a primary containment housing; a powder spreading member coupled to the base member, the powder spreading member at least partially encapsulated by the primary containment housing; and a containment mechanism at least partially encapsulated by the primary containment housing; positioning the containment mechanism into a first position when the base member is moving in the first lateral direction; and positioning the containment mechanism into a second position different from the first position when the base member is moving in the second lateral direction.

The method of any preceding clause, wherein the powder spreading member includes a first roller rotatably coupled to the base member.

The method of any preceding clause, wherein the powder spreading member further includes a second roller rotatably coupled to the base member, wherein the containment mechanism includes a central shaft rotatably coupled to the base member, a first flange extending from the central shaft, and a second flange extending from the central shaft opposite the first flange, wherein, in the first position, an end of the first flange extends toward an inner surface of the primary containment housing and an end of the second flange extends toward an outer surface of the second roller, and wherein, in the second position, the end of the first flange extends toward an outer surface of the first roller and the end of the second flange extends toward the inner surface of the primary containment housing.

It will be apparent to those skilled in the art that various modifications and variations can be made to the embodiments described herein without departing from the scope of the claimed subject matter. Thus, it is intended that the specification cover the modifications and variations of the various embodiments described herein provided such modification and variations come within the scope of the appended claims and their equivalents.

What is claimed is:

1. A recoat assembly for an additive manufacturing system, the recoat assembly comprising:
   a base member movable in a first lateral direction and a second lateral direction opposite the first lateral direction, the base member including a primary containment housing;
   a powder spreading member coupled to the base member, the powder spreading member at least partially encapsulated by the primary containment housing; and
   a containment mechanism rotates in a first direction to be positionable into a first position when the base member is moving in the first lateral direction, and rotates in a second direction opposite the first direction to be positionable into a second position different from the first position when the base member is moving in the second lateral direction,
   wherein when the containment mechanism is in the first position, the containment mechanism is inhibited from further rotating in the first direction;
   wherein when the containment mechanism is in the second position, the containment mechanism is inhibited from further rotating in the second direction.

2. The recoat assembly of claim 1, wherein the powder spreading member includes a first roller and a second roller rotatably coupled to the base member.

3. The recoat assembly of claim 2, wherein the containment mechanism includes a central shaft rotatably coupled to the base member, a flange coupled to the central shaft and including a flange base, a first angular flange portion, and a second angular flange portion, the first angular flange portion and the second angular flange portion extending at an oblique angle from the flange base.

4. The recoat assembly of claim 2, wherein the containment mechanism includes a central shaft rotatably coupled to the base member, a first flange extending from the central shaft, and a second flange extending from the central shaft opposite the first flange.

5. The recoat assembly of claim 4, wherein, in the first position, an end of the first flange extends toward an inner surface of the primary containment housing and an end of the second flange extends toward an outer surface of the second roller, and wherein, in the second position, the end of the first flange extends toward an outer surface of the first roller and the end of the second flange extends toward the inner surface of the primary containment housing.

6. The recoat assembly of claim 5, wherein, in the first position, the end of the first flange contacts the inner surface of the primary containment housing and the end of the second flange contacts the outer surface of the second roller, and wherein, in the second position, the end of the first flange contacts the outer surface of the first roller and the end of the second flange contacts the inner surface of the primary containment housing.

7. The recoat assembly of claim 2, wherein the containment mechanism includes a first flat and a second flat spaced apart from the first flat, the first flat and the second flat each movable through the primary containment housing between a raised position and a lowered position.

8. The recoat assembly of claim 7, wherein;
when the first flat is in the lowered position, an end of the first flat contacts the first roller; and
when the second roller is in the lowered position, an end of the second flat contacts the second roller.

9. The recoat assembly of claim 7, wherein, in the first position, the first flat is in the raised position and the second flat is in the lowered position, and wherein, in the second position, the first flat is in the lowered position and the second flat is in the raised position.

10. The recoat assembly of claim 2, wherein the base member includes a secondary containment housing that is spaced apart from and at least partially encapsulates the primary containment housing.

11. The recoat assembly of claim 10, wherein the containment mechanism includes a first scraper assembly and a second scraper assembly each extending through the secondary containment housing and extending toward a respective one of the first roller and the second roller, the first scraper assembly and the second scraper assembly each including a scraper blade that contacts a respective one of the first roller and the second roller.

12. An additive manufacturing system comprising:
a recoat assembly comprising:
a base member movable in a first lateral direction and a second lateral direction opposite the first lateral direction, the base member including a primary containment housing;
a powder spreading member coupled to the base member, the powder spreading member at least partially encapsulated by the primary containment housing, the powder spreading member including a first roller and a second roller; and
a containment mechanism rotates in a first direction to be positionable into a first position when the base member is moving in the first lateral direction, and rotates in a second direction opposite the first direction to be positionable into a second position different from the first position when the base member is moving in the second lateral direction; and
a build area positioned below the recoat assembly, the recoat assembly movable across the build area in the first lateral direction and the second lateral direction, wherein when the containment mechanism is in the first position, the containment mechanism is inhibited from further rotating in the first direction;
wherein when the containment mechanism is in the second position, the containment mechanism is inhibited from further rotating in the second direction.

13. The additive manufacturing system of claim 12, wherein the containment mechanism includes a central shaft rotatably coupled to the base member, a flange coupled to the central shaft and including a flange base, a first angular flange portion, and a second angular flange portion, the first angular flange portion and the second angular flange portion extending at an oblique angle from the flange base.

14. The additive manufacturing system of claim 12, wherein:
the containment mechanism includes a first flat and a second flat spaced apart from the first flat, the first flat and the second flat each movable through the primary containment housing between a raised position and a lowered position;
when the first flat is in the lowered position, an end of the first flat contacts the first roller, and
when the second flat is in the lowered position, an end of the second flat contacts the second roller,
in the first position, the first flat is in the raised position and the second flat is in the lowered position,
in the second position, the first flat is in the lowered position and the second flat is in the raised position.

15. The additive manufacturing system of claim 12, wherein the base member includes a secondary containment housing that is spaced apart from and at least partially encapsulates the primary containment housing, wherein the containment mechanism includes a first scraper assembly and a second scraper assembly each extending through the secondary containment housing and extending toward a respective one of the first roller and the second roller, the first scraper assembly and the second scraper assembly each including a scraper blade that contacts a respective one of the first roller and the second roller.

16. The additive manufacturing system of claim 12, wherein the containment mechanism includes a central shaft rotatably coupled to the base member, a first flange extending from the central shaft, and a second flange extending from the central shaft opposite the first flange.

17. The additive manufacturing system of claim 16, wherein, in the first position, an end of the first flange extends toward an inner surface of the primary containment housing and an end of the second flange extends toward an outer surface of the second roller, and wherein, in the second position, the end of the first flange extends toward an outer surface of the first roller and the end of the second flange extends toward the inner surface of the primary containment housing.

18. A method comprising:
providing a recoat assembly comprising:
a base member movable in a first lateral direction and a second lateral direction opposite the first lateral direction over a build area, the base member including a primary containment housing;
a powder spreading member coupled to the base member, the powder spreading member at least partially encapsulated by the primary containment housing; and
a containment mechanism at least partially encapsulated by the primary containment housing;

rotating the containment mechanism in a first direction into a first position when the base member is moving in the first lateral direction;

inhibiting the containment mechanism from further rotating in the first direction when the containment mechanism is in the first position;

rotating the containment mechanism in a second direction opposite the first direction into a second position different from the first position when the base member is moving in the second lateral direction; and inhibiting the containment mechanism from further rotating in the second position when the containment mechanism is in the second position.

19. The method of claim 18, wherein the powder spreading member includes a first roller rotatably coupled to the base member.

20. The method of claim 19, wherein the powder spreading member further includes a second roller rotatably coupled to the base member, wherein the containment mechanism includes a central shaft rotatably coupled to the base member, a first flange extending from the central shaft, and a second flange extending from the central shaft opposite the first flange, wherein, in the first position, an end of the first flange extends toward an inner surface of the primary containment housing and an end of the second flange extends toward an outer surface of the second roller, and wherein, in the second position, the end of the first flange extends toward an outer surface of the first roller and the end of the second flange extends toward the inner surface of the primary containment housing.

\* \* \* \* \*